(12) United States Patent
Clark et al.

(10) Patent No.: US 12,080,136 B2
(45) Date of Patent: Sep. 3, 2024

(54) TRANSITION ZONE RFID TAG MANAGEMENT

(71) Applicant: Sensormatic Electronics, LLC, Boca Raton, FL (US)

(72) Inventors: John Clark, Boynton Beach, FL (US); Adam S. Bergman, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 179 days.

(21) Appl. No.: 17/174,051

(22) Filed: Feb. 11, 2021

(65) Prior Publication Data

US 2021/0287506 A1  Sep. 16, 2021

Related U.S. Application Data

(60) Provisional application No. 62/987,753, filed on Mar. 10, 2020.

(51) Int. Cl.
*G08B 13/14* (2006.01)
*G06K 7/10* (2006.01)
(Continued)

(52) U.S. Cl.
CPC ..... *G08B 13/2462* (2013.01); *G06K 7/10366* (2013.01); *G08B 13/2417* (2013.01);
(Continued)

(58) Field of Classification Search
CPC ........... G08B 13/2462; G08B 13/2417; G08B 13/2474; G06K 7/10366; H01Q 1/2216; H01Q 3/24
See application file for complete search history.

(56) References Cited

U.S. PATENT DOCUMENTS 5,005,001 A * 4/1991 Cordery ............ G08B 13/2477
340/572.2
5,126,749 A * 6/1992 Kaltner ................ H01Q 21/29
343/742
(Continued)

FOREIGN PATENT DOCUMENTS

WO       2013126391 A1    8/2013

OTHER PUBLICATIONS

Gabriel Nasser, Using RFID for Risk Mitigation and Location Assuredness of High-Value Goods (Year: 2008).*

(Continued)

*Primary Examiner* — Quang Pham
(74) *Attorney, Agent, or Firm* — ArentFox Schiff LLP (57) ABSTRACT

Deploying at each transition between separate areas of a facility a plurality of RFID reader antennas. Each antenna is deployed at a given transition covering a span of the given transition from a different perspective such that each point in the span is covered by at least two antennas. The antennas of a first transition between a first area and a second area of the separate areas detect, and in combination with an RFID system in communication with the antennas of the first transition, a tag known to have been in the first area. The RFID system identifies an item associated with the detected tag as moving to the second area. The antennas of a particular transition of the second area subsequently detect, in combination with the RFID system in communication therewith, the tag, and identifying the detected item as leaving the second area for an area across the particular transition.

18 Claims, 7 Drawing Sheets

(51) Int. Cl.
*G08B 13/24* (2006.01)
*H01Q 1/22* (2006.01)
*H01Q 3/24* (2006.01)

(52) U.S. Cl.
CPC ....... *G08B 13/2474* (2013.01); *H01Q 1/2216* (2013.01); *H01Q 3/24* (2013.01)

(56) References Cited

U.S. PATENT DOCUMENTS

| | | | | |
|---|---|---|---|---|
| 6,538,603 | B1* | 3/2003 | Chen | H01Q 3/36 342/372 |
| 6,883,710 | B2* | 4/2005 | Chung | H01Q 7/00 235/383 |
| 7,460,073 | B2* | 12/2008 | Schillmeier | H01Q 1/2216 340/572.1 |
| 7,852,268 | B2* | 12/2010 | Schillmeier | H01Q 1/2216 343/700 MS |
| 8,102,267 | B1* | 1/2012 | Arumugam | G01S 5/12 340/572.1 |
| 8,212,678 | B2* | 7/2012 | Scherabon | H04B 5/77 340/10.2 |
| 8,742,930 | B2* | 6/2014 | Hong | G08B 13/248 340/572.2 |
| 9,183,717 | B1* | 11/2015 | Diorio | G08B 13/2474 |
| 9,519,811 | B1 | 12/2016 | Simon et al. | |
| 9,734,368 | B1* | 8/2017 | Kantor | G06K 7/10366 |
| 9,841,490 | B1* | 12/2017 | Swartz | G01S 5/0295 |
| 9,959,439 | B1* | 5/2018 | Lui | G06Q 10/0833 |
| 10,515,243 | B1* | 12/2019 | Ray | G08B 21/22 |
| 2003/0197612 | A1* | 10/2003 | Tanaka | G08B 13/2462 340/8.1 |
| 2005/0140511 | A1 | 6/2005 | Bonnell et al. | |
| 2007/0027579 | A1* | 2/2007 | Suzuki | G05D 1/0274 700/245 |
| 2008/0111662 | A1* | 5/2008 | Sakama | G06K 7/10336 340/10.1 |
| 2011/0304434 | A1* | 12/2011 | Kohli | G07B 15/063 340/10.1 |
| 2011/0304441 | A1 | 12/2011 | Roesner | |
| 2011/0309910 | A1* | 12/2011 | Lee | G07C 9/257 340/5.52 |
| 2012/0212327 | A1* | 8/2012 | Torabi | G06K 7/10099 340/10.1 |
| 2012/0313759 | A1* | 12/2012 | Markwitz | G08B 21/22 340/10.1 |
| 2014/0167965 | A1 | 6/2014 | Sawyer | |
| 2014/0224870 | A1* | 8/2014 | Schoening | G06K 7/10366 235/376 |
| 2014/0361078 | A1 | 12/2014 | Davidson | |
| 2014/0365194 | A1* | 12/2014 | O'Hagan | G05B 15/02 703/11 |
| 2014/0375429 | A1* | 12/2014 | Cristache | G01S 5/0289 340/10.1 |
| 2017/0067983 | A1* | 3/2017 | Teicher | A61B 5/1113 |
| 2017/0101278 | A1* | 4/2017 | Stone | B65G 69/00 |
| 2017/0234963 | A1* | 8/2017 | Johnson | G01N 33/0009 342/451 |
| 2017/0249584 | A1* | 8/2017 | Lavery | G06K 17/0022 |
| 2018/0350221 | A1* | 12/2018 | Chabra | G06F 16/381 |
| 2018/0375444 | A1* | 12/2018 | Gamroth | G05B 19/0426 |
| 2019/0079176 | A1* | 3/2019 | Weissman | G01S 13/876 |
| 2019/0325173 | A1* | 10/2019 | Tingler | G06K 7/10356 |
| 2020/0042754 | A1* | 2/2020 | Trivelpiece | G06K 7/10366 |
| 2020/0096599 | A1* | 3/2020 | Hewett | G07G 1/009 |
| 2021/0104335 | A1* | 4/2021 | Han | G16Y 10/05 |
| 2021/0390811 | A1* | 12/2021 | Learmonth | H04L 63/0442 |

OTHER PUBLICATIONS

Michael Keenan, RFID Technology What It Is and How to Use It In Your Store (Year: 2021).*

Wan et al., Capturing Customer Browsing Insights through RFID Tag Motion Detection in High Tag Density Environments (Year: 2021).*

International Search Report and Written Opinion issued in International Patent Application No. PCT/US2021/017806 on May 21, 2021.

* cited by examiner

| BBBB...B31...400 – Added | BBBB...B31...400 – Added | BBBB...B31...400 – SHOP FLOOR |
|---|---|---|
| BBBB...B31...400 – Removed | BBBB...B31...400 – Removed | BBBB...B02...400 – SHOP FLOOR |
| BBBB...B02...400 – Added | BBBB...B02...400 – Added | BBBB...B16...400 – SHOP FLOOR |
| BBBB...B16...400 – Added | BBBB...B16...400 – Added | BBBB...B28...400 – SHOP FLOOR |
| BBBB...B28...400 – Added | BBBB...B28...400 – Added | BBBB...B42...400 – SHOP FLOOR |
| BBBB...B42...400 – Added | BBBB...B42...400 – Added | BBBB...B32...400 – CHANGING ROOM |
| BBBB...B28...400 – Removed | BBBB...B28...400 – Removed | BBBB...B05...400 – REJECTION AREA |
| BBBB...B42...400 – Removed | BBBB...B42...400 – Removed | BBBB...B17...400 – REJECTION AREA |
| BBBB...B02...400 – Removed | BBBB...B02...400 – Removed | BBBB...B29...400 – CHANGING ROOM |
| BBBB...B16...400 – Removed | BBBB...B16...400 – Removed | BBBB...B47...400 – SHOP FLOOR |

10  13

Additional list (right column continued):
- BBBB...B51...400 – SHOP FLOOR
- BBBB...B88...400 – CHANGING ROOM
- BBBB...B75...400 – SHOP FLOOR
- BBBB...B77...400 – SHOP FLOOR
- BBBB...B66...400 – SHOP FLOOR
- BBBB...B99...400 – SHOP FLOOR
- BBBB...B88...400 – CHANGING ROOM
- BBBB...B09...400 – CHANGING ROOM
- BBBB...B47...400 – CHANGING ROOM
- BBBB...B33...400 – REJECTION AREA
- BBBB...B77...400 – CHANGING ROOM
- BBBB...B31...400 – REJECTION AREA
- BBBB...B02...400 – REJECTION AREA
- BBBB...B16...400 – REJECTION AREA
- BBBB...B28...400 – CHANGING ROOM
- BBBB...B42...400 – CHANGING ROOM
- BBBB...B32...400 – CHANGING ROOM
- BBBB...B05...400 – REJECTION AREA
- BBBB...B17...400 – CHANGING ROOM Left list (under 10):
- BBBB...B31...400
- BBBB...B02...400
- BBBB...B16...400
- BBBB...B28...400
- BBBB...B42...400
- BBBB...B32...400
- BBBB...B05...400
- BBBB...B17...400
- BBBB...B29...400
- BBBB...B47...400

Middle list (under 13):
- BBBB...B31...400
- BBBB...B02...400
- BBBB...B16...400
- BBBB...B28...400
- BBBB...B42...400
- BBBB...B32...400
- BBBB...B05...400
- BBBB...B17...400
- BBBB...B29...400
- BBBB...B47...400

[Clear]

IN: 23   OUT: 10   CHG RM: 13   REJECT: 10

FIG. 4

Fitting Room Detail Report

Store #538
Men's Fitting Room

| EPC | First Seen | Change Area | Rejection Area Time | Return To Shop Floor | Time Off Shop Floor | Conversion |
|---|---|---|---|---|---|---|
| BBBB...B31...400 | 02/28/2020 10:58:45 | 0:12:34 | 2:31:46 | 02/28/2020 13:43:05 | 2:44:20 | N |
| BBBB...B02...400 | 02/28/2020 10:58:45 | 0:12:34 | 2:31:46 | 02/28/2020 13:43:05 | 2:44:20 | N |
| BBBB...B16...400 | 02/28/2020 10:58:45 | 0:12:34 | 2:31:46 | 02/28/2020 13:43:05 | 2:44:20 | N |
| BBBB...B28...400 | 02/28/2020 11:08:45 | 0:03:55 | 0:01:00 | 02/28/2020 11:13:40 | 0:04:55 | Y |
| BBBB...B42...400 | 02/28/2020 11:08:45 | 0:04:39 | 0:02:09 | 02/28/2020 11:15:33 | 0:06:48 | Y |
| BBBB...B32...400 | 02/28/2020 11:10:21 | 0:07:54 | 1:21:32 | 02/28/2020 12:39:47 | 1:29:26 | N |
| BBBB...B05...400 | 02/28/2020 11:13:56 | 0:10:25 | 1:17:51 | 02/28/2020 12:42:12 | 1:28:16 | N |
| BBBB...B17...400 | 02/28/2020 11:15:09 | 0:09:10 | 1:15:41 | 02/28/2020 12:40:00 | 1:24:51 | N |
| BBBB...B29...400 | 02/28/2020 11:31:29 | 0:05:55 | 1:00:19 | 02/28/2020 12:37:43 | 1:06:14 | N |
| BBBB...B47...400 | 02/28/2020 11:31:29 | 0:05:55 | 1:00:19 | 02/28/2020 12:37:43 | 1:06:14 | N |
| | Men's Avg. Times | 0:08:33 | 1:21:25 | | 1:29:58 | 20% |

Women's Fitting Room

| EPC | First Seen | Change Area | Rejection Area Time | Return To Shop Floor | Time Off Shop Floor | Conversion |
|---|---|---|---|---|---|---|
| BBBB...B31...400 | 02/28/2020 8:58:45 | 0:10:34 | 1:00:46 | 02/28/2020 10:10:05 | 1:11:20 | N |
| BBBB...B02...400 | 02/28/2020 8:58:45 | 0:10:34 | 1:00:46 | 02/28/2020 10:10:05 | 1:11:20 | N |
| BBBB...B16...400 | 02/28/2020 9:10:21 | 0:12:34 | 2:31:46 | 02/28/2020 10:10:05 | 2:44:20 | N |
| BBBB...B28...400 | 02/28/2020 9:12:56 | 0:05:55 | 0:01:00 | 02/28/2020 10:10:05 | 0:06:55 | N |
| BBBB...B42...400 | 02/28/2020 9:12:56 | 0:05:55 | 0:01:00 | 02/28/2020 10:10:05 | 0:06:55 | N |
| BBBB...B32...400 | 02/28/2020 9:30:15 | 0:03:21 | 0:01:00 | 02/28/2020 10:10:05 | 0:04:21 | N |
| BBBB...B05...400 | 02/28/2020 9:44:19 | 0:10:25 | 1:17:51 | 02/28/2020 10:10:05 | 1:28:16 | N |
| BBBB...B17...400 | 02/28/2020 9:46:09 | 0:11:10 | 1:15:41 | 02/28/2020 10:10:05 | 1:26:51 | N |
| BBBB...B29...400 | 02/28/2020 9:55:29 | 0:05:55 | 1:00:19 | 02/28/2020 10:10:05 | 1:06:14 | N |
| BBBB...B47...400 | 02/28/2020 10:01:29 | 0:05:55 | 1:00:19 | 02/28/2020 10:10:05 | 1:06:14 | N |
| BBBB...B51...400 | 02/28/2020 10:58:45 | 0:12:34 | 2:31:46 | 02/28/2020 10:10:05 | 2:44:20 | N |
| BBBB...B88...400 | 02/28/2020 10:58:45 | 0:12:34 | 2:31:46 | 02/28/2020 10:10:05 | 2:44:20 | N |
| BBBB...B75...400 | 02/28/2020 10:58:45 | 0:12:34 | 2:31:46 | 02/28/2020 10:10:05 | 2:44:20 | N |
| BBBB...B66...400 | 02/28/2020 11:08:45 | 0:03:55 | 0:01:00 | 02/28/2020 10:10:05 | 0:04:55 | N |
| BBBB...B99...400 | 02/28/2020 11:08:45 | 0:04:39 | 0:02:09 | 02/28/2020 10:10:05 | 0:06:48 | N |
| BBBB...B88...400 | 02/28/2020 11:10:21 | 0:07:54 | 1:21:32 | 02/28/2020 10:10:05 | 1:29:26 | N |
| BBBB...B09...400 | 02/28/2020 11:13:56 | 0:10:25 | 1:17:51 | 02/28/2020 10:10:05 | 1:28:16 | N |
| BBBB...B47...400 | 02/28/2020 11:15:09 | 0:09:10 | 1:15:41 | 02/28/2020 10:10:05 | 1:24:51 | N |
| BBBB...B33...400 | 02/28/2020 11:31:29 | 0:05:55 | 1:00:19 | 02/28/2020 10:10:05 | 1:06:14 | N |
| BBBB...B77...400 | 02/28/2020 11:31:29 | 0:05:55 | 1:00:19 | 02/28/2020 10:10:05 | 1:06:14 | N |
| | Woman's Avg. Times | 0:08:24 | 1:08:14 | | 1:16:38 | 25% |
| Store Averages | | 0:08:29 | 1:14:49 | | 1:23:18 | 23% |

Fitting Room Store Comparison Report

| Store | Change Area Time | Rejection Area Time | Time Off Shop Floor | Conversion |
|---|---|---|---|---|
| Store #538 | 0:08:29 | 1:14:49 | 1:23:18 | 23% |
| Store #288 | 0:08:33 | 1:16:33 | 1:25:06 | 24% |
| Store #187 | 0:08:40 | 1:18:44 | 1:27:24 | 22% |
| Store #987 | 0:09:42 | 1:25:00 | 1:34:42 | 20% |
| Store #474 | 0:09:47 | 1:33:05 | 1:42:52 | 19% |
| Store #488 | 0:10:22 | 1:47:51 | 1:58:13 | 17% |
| Enterprise Avg. | 0:09:15 | 1:26:00 | 1:35:16 | 21% |

Deploying at each transition between separate areas of a facility a plurality of RFID reader antennas, each antenna deployed at a given transition covering a span of the given transition from a different perspective such that each point in the span is covered by at least two antennas.
710

Detecting, by the antennas of a first transition between a first area and a second area of the separate areas, and in combination with an RFID system in communication with the antennas of the first transition, a tag known to have been in the first area, and identifying an item associated with the detected tag as moving to the second area.
720

Subsequently detecting, by the antennas of a particular transition of the second area, and in combination with the RFID system in communication therewith, the tag, and identifying the detected item as leaving the second area for an area across the particular transition.
730

FIG. 7

TRANSITION ZONE RFID TAG MANAGEMENT

CROSS REFERENCE TO RELATED APPLICATIONS

This application claims the benefit of U.S. Provisional Application No. 62/987,753 filed Mar. 10, 2020, the contents of which are hereby incorporated herein in their entirety by reference.

TECHNICAL FIELD

The present disclosure relates to radio frequency identification (RFID) tag management through transition zones in a facility.

BACKGROUND

RFID tag systems are commonly used in retail stores and other settings (such as warehouses and offices) to prevent unauthorized removal of tagged items from a given area. Articles to be protected are tagged with a security tag, e.g., an RFID tag that, when activated, generates a response signal when passed through an interrogation zone. An antenna and receiver detects this response signal and may generate an alarm if the security tag has not been accounted for. Similarly, detectors in an RFID system emit periodic bursts in the radio frequency range that causes a detectable resonant response in an RFID tag.

For example, retailers (e.g., apparel retailers) have deployed security tags on products in stores to track product movements as the products arrive at stores, are placed on display on the sales floor, and are sold. The tags may be used with a security system to detect inventory changes and/or possible loss events.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein deploy at each transition between separate areas of a facility a plurality of RFID reader antennas. Each antenna is deployed at a given transition covering a span of the given transition from a different perspective such that each point in the span is covered by at least two antennas. The antennas of a first transition between a first area and a second area of the separate areas detect, in combination with an RFID system in communication with the antennas of the first transition, a tag known to have been in the first area. The RFID system identifies an item associated with the detected tag as moving to the second area. The antennas of a particular transition of the second area subsequently detect, in combination with the RFID system in communication therewith, the tag, and identify the detected item as leaving the second area for an area across the particular transition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

FIG. 4 is an example data set collected in accordance with examples of the technology disclosed herein.

FIG. 5 is an example report produced in accordance with examples of the technology disclosed herein.

DETAILED DESCRIPTION

Figure 1:
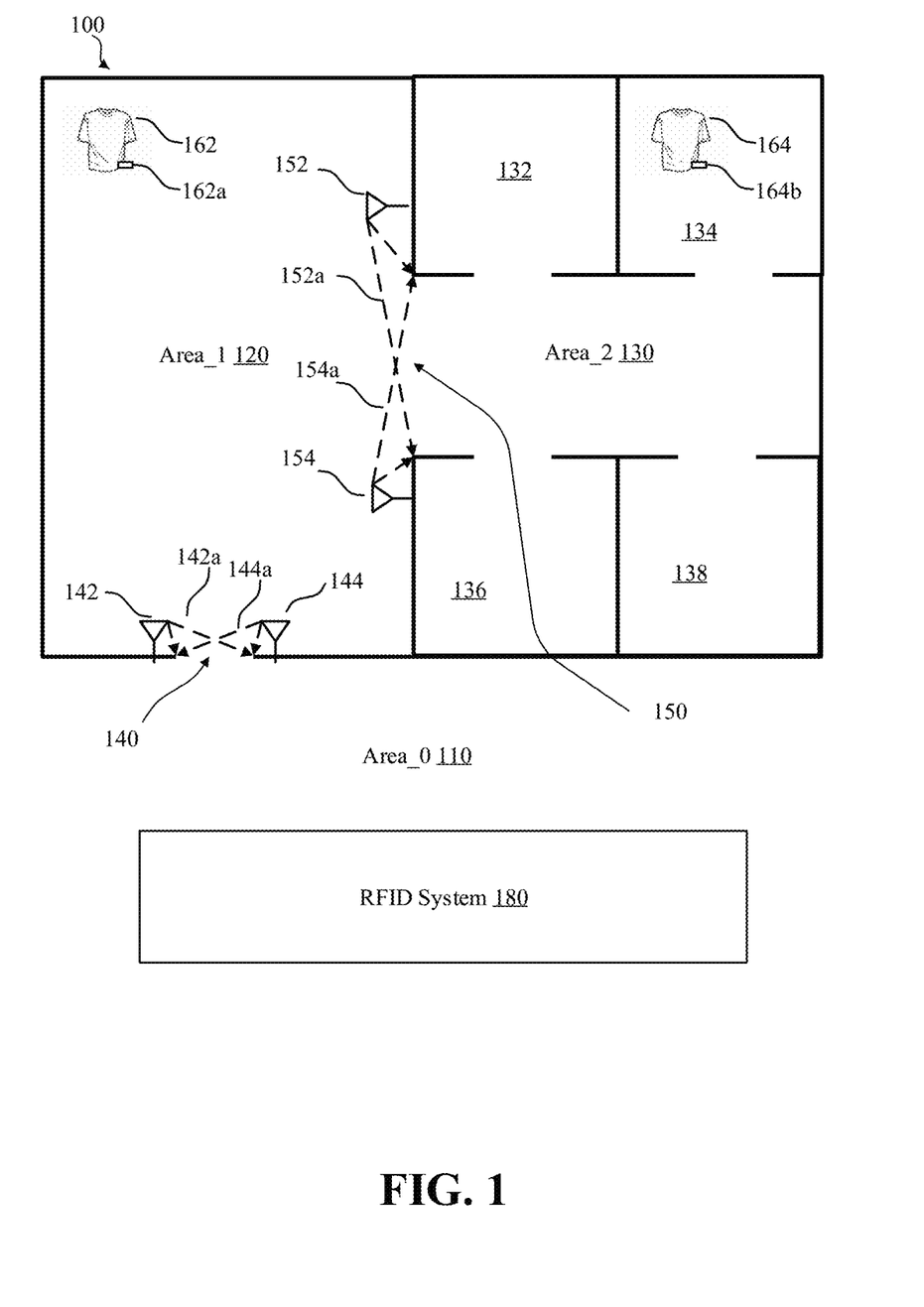
FIG. 1 is a topology of an example facility including a transition zone RFID tag management system, in accordance with example of the technology disclosed herein.

Referring to FIG. 1, in a continuing example, a retailer wants to keep track of merchandise, e.g., item 162 tagged with tag 162a and item 164 tagged with tag 164b, that goes into and out of sub-areas a fitting area 100 of a retail store. While a retail store is used in the continuing example, the overall area of interest can be in other than a retail store. For example, a warehouse may have a loading dock that is an area of interest.

Figure 2:
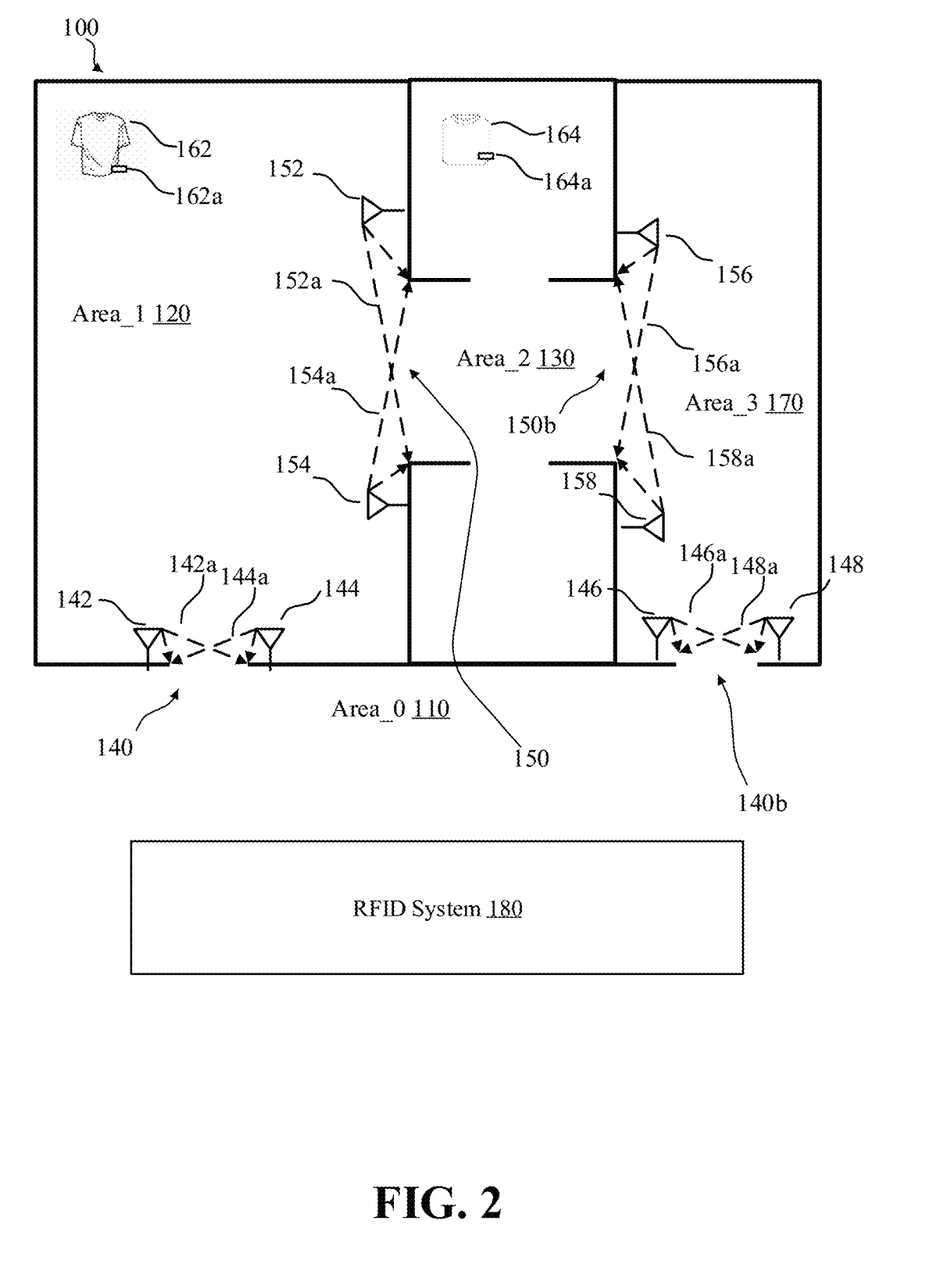
FIG. 2 is a topology of an example facility including a transition zone RFID tag management system, in accordance with example of the technology disclosed herein.

The fitting area 100 of the example has two sub-areas. Area_2 130 includes a plurality of individual fitting rooms 132, 134, 136, and 138. Area_1 120 acts as a foyer for Area_2 130 and as a rejection area where items 162 that a customer decides not to purchase can be left for re-stocking. While two sub-areas (Area_1 120 and Area_2 130) are show, examples of the technology disclosed herein can be deployed across more than two sub-areas, for example, as shown in FIG. 2 discussed below.

In the continuing example, Area_1 120 connects to the sales floor Area_0 110 through transition 140 (a single doorway). Area_1 120 connects to Area_2 130 through transition 150 (also a single doorway). Area_2 130 has no direct transition to the sales floor.

Each transition 140, 150 is flanked by at least two RFID transmit/receive antennas, e.g., antennas 142 and 44 for transition 140, and antennas 152 and 154 for transition 150. In the continuing example, each pair of antennas sit over corresponding doorway so as to offer redundant coverage of the doorway from at least two different perspectives. In some examples, more than two antennas are used to cover a particular transition.

Figure 3:
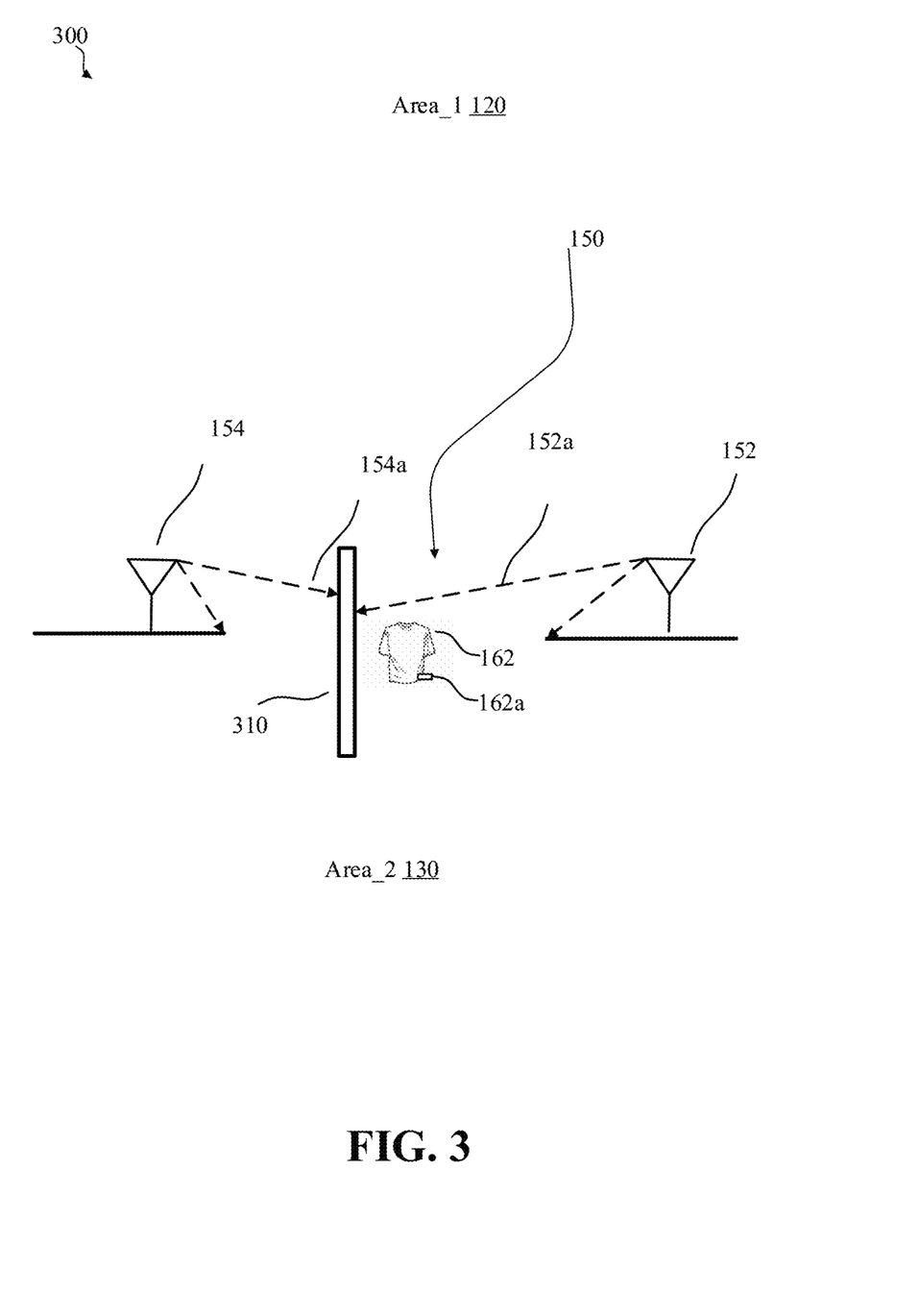
FIG. 3 is a topology of an example transition zone, in accordance with example of the technology disclosed herein.

Each antenna in the continuing example is a narrow beam antenna, e.g., less than 40-degree beam width 142a, 144a, 152a, 154a. In practice, electronically steerable and electronic beam-width controlled antennas can be used; and angles other than 40 degrees can be used. Each beam width and the number of antennas is chosen such that each point across the transition 140, 150 is covered from at least two perspectives—without covering the entirety of Area_1 120. FIG. 3 illustrates a scenario 300 where a shielding object 310 shields item 162 with tag 162a from the field of view 154a of antenna 154, but not from the field of view 152a of antenna 152—illustrating the utility of coverage of the transition 150 between Area_1 120 and Area_2 130 from a plurality of perspectives.

Each of antennas 142, 144, 152, and 154 are in communication (by wired, wireless, or a combination thereof) with RFID system 180. RFID system 180 performs tag identification as known to those of skill in the relevant art based on interrogation signals transmitted by antennas such as antennas 141, 144, 152, and 154 and based on transponder signals, e.g., from tag 162a, received by those antennas in response to the interrogation signals. RFID system 180 also performs other functions as will be described below.

Based on tag detections via antennas 142 and 144 across transition 140, RFID system can determine when a tagged item, e.g., item 162 with tag 162a, crosses transition 140. If the item/tag 162/162a has not previously crossed transition 140, then the RFID system 180 can determine that the item/tag 162/162a has entered Area_1 120. If the item/tag 162/162a is then detected crossing transition 150 by RFID system 180 based on RFID signals collected by antennas 152 and 154, then RFID system 180 can determine that the item/tag 162/162a has left Area_1 120 and entered the individual fitting room area Area_2 130. For example, RFID system 180, based on item/tag 164/164a being detected at transition 140 and then shortly thereafter at transition 150 can determine that item 164 has entered the individual fitting room area Area_2 130.

Typical RFID systems use persistent real-time RFID tag reading across the entire area being monitored—often in ways that are susceptible to error from shielding, since an open area allows a myriad of shielding geometries. Performing RFID at transitions from a small plurality of antennas can reduce the opportunities for shielding.

While FIG. 1 illustrates transitions between Area_0 110, Area_1 120, and Area_2 130, examples of the technology can be deployed across the transitions to smaller areas such as the transitions to individual fitting rooms 132, 134, 136, and 138.

FIG. 2 illustrates another topology 200, of many other possible topologies, for examples of the present technology. In topology 200, a third area, Area_3 170, is introduced opposite of Area_1 120 from Area_2 130. Area_3 170 has its own transition 140b with Area_0 110, and its own transition 150b with Area_2 130. Transition 140b is covered by antenna 146 with field of view 146a and antenna 148 with field of view 148a. Transition 150b also is covered by antenna 156 with field of view 156a and antenna 158 with field of view 158a. Antennas 146, 148, 156, and 158 are in communication with RFID system 180 as with the previously described antennas, and perform the transmit and receive functions of interrogation and transponder reception typical of such systems. In the example of FIG. 2, RFID system 180 uses the sequential detection of tags such as tag 162a and tag 162b to determine the area in which items such as item 162 and item 164 are located.

FIG. 4 illustrates raw transition detection data, and FIG. 5 illustrates report data processed and reported by RFID system 180 based on transponder data harvested by antennas 142, 144, 152, and 154 of FIG. 1, in accordance with one example of the present technology. In each of FIG. 4 and FIG. 5, individual tags are tracked by the electronic product code (EPC) associated with the individual tag.

In FIG. 5, given that each tag detection is time-stamped and is characterized by an EPC, RFID system 180 can determine the sequence and duration of a tag in each area 110, 120, and 130. In combination with transaction data, RFID 180 can related the sequence and duration of a tagged item across with areas with conversion rates.

Figure 6:
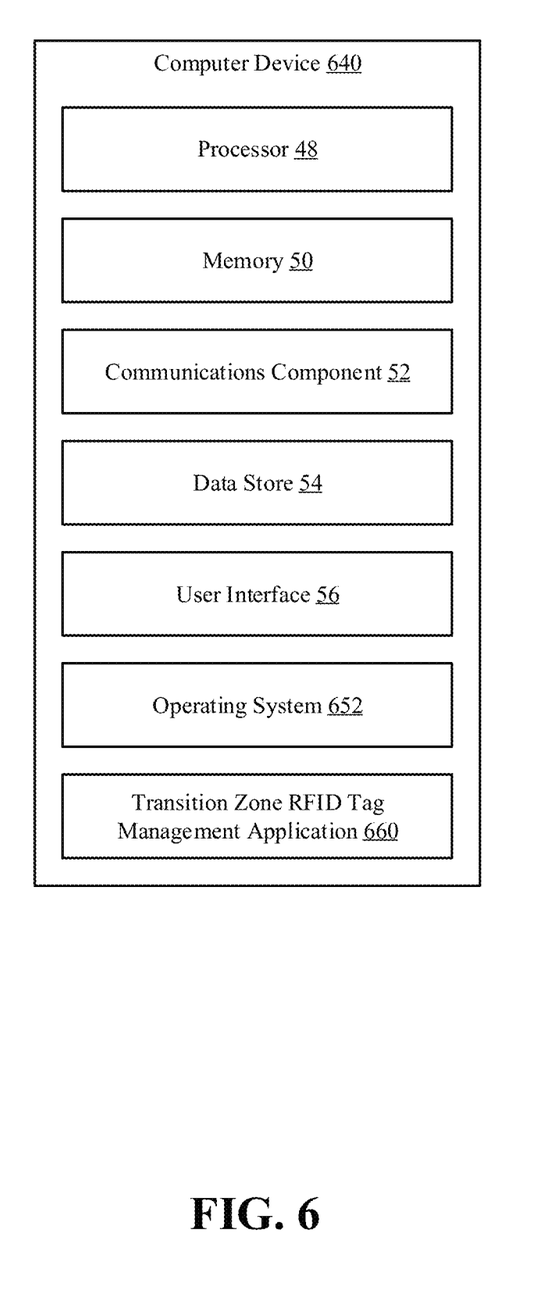
FIG. 6 is a schematic block diagram of an example computer device, in accordance with an implementation of the present disclosure.

Referring now to FIG. 6, illustrated is an example computer device 640 in accordance with an implementation, including additional component details as compared to FIG. 1. The computer device 640 may be an example of the RFID system 180 of FIG. 1. In one example, computer device 640 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include a CPU.

In an example, computer device 640 may include memory 50 for storing instructions executable by the processor 48 for carrying out the functions described herein. In an implementation, for example, memory 50 may include random access memory. The memory 50 may include instructions for executing a transition zone RFID tag management application 660 for executing the methods disclosed herein.

Further, computer device 640 may include a communications component 52 that provides for establishing and maintaining communications with one or more parties utilizing hardware, software, and services as described herein. Communications component 52 may carry communications between components on computer device 640, as well as between computer device 240 and external devices, such as devices located across a communications network and/or devices serially or locally connected to computer device 640. For example, communications component 52 may include one or more buses, and may further include transmit chain components and receive chain components associated with a transmitter and receiver, respectively, operable for interfacing with external devices.

Additionally, computer device 640 may include a data store 54, which can be any suitable combination of hardware and/or software, that provides for mass storage of information, databases, and programs employed in connection with implementations described herein. For example, data store 54 may be a data repository for operating system 652 and/or transition zone RFID tag management application 660. The data store may include memory 50 and/or storage device 54.

Computer device 640 may also include a user interface component 56 operable to receive inputs from a user of computer device 640 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 652 and/or transition zone RFID tag management application 660. In addition, processor 48 may execute operating system 652 and/or transition zone RFID tag management application 660, and memory 50 or data store 54 may store them.

Figure 7:
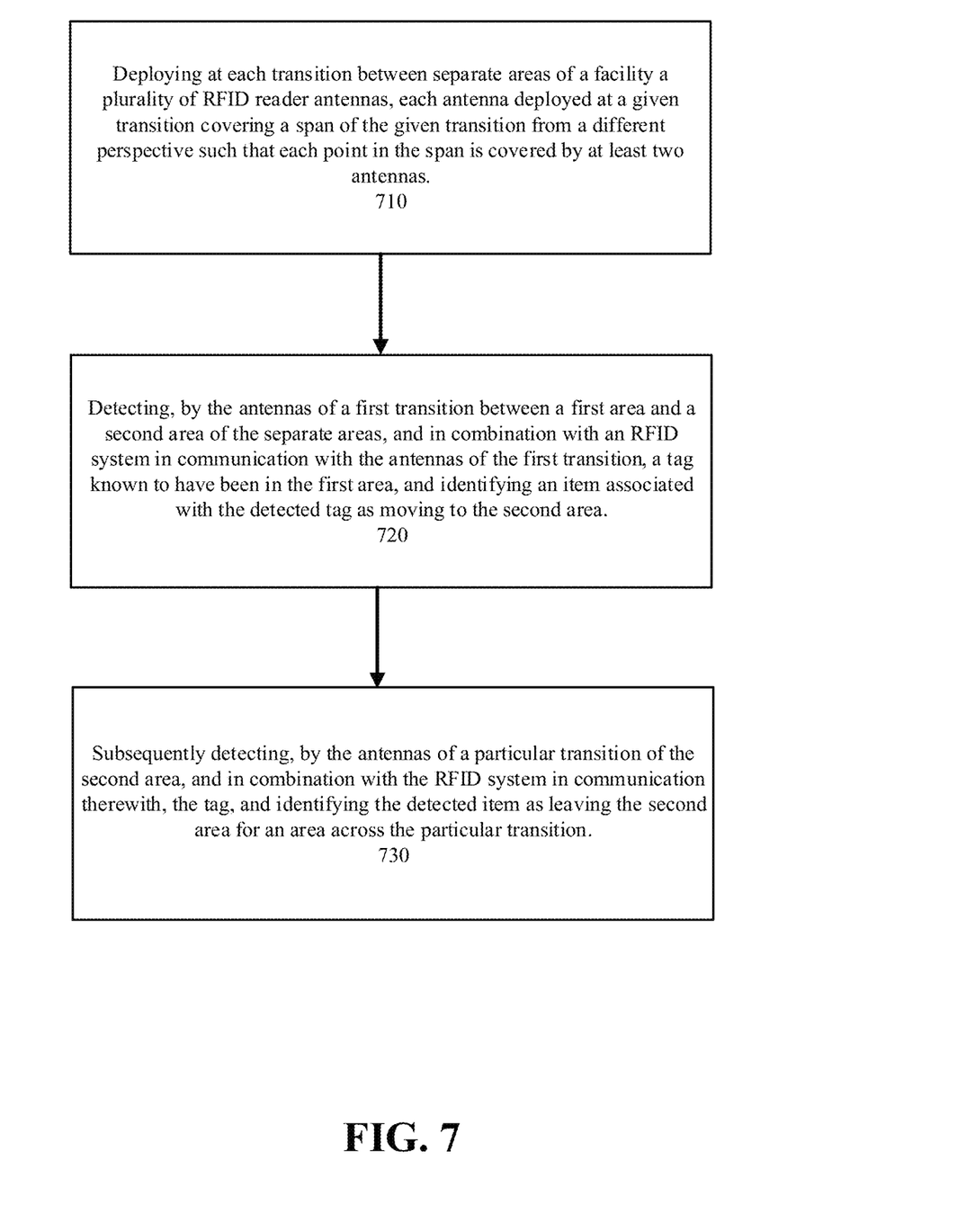
FIG. 7 is a block diagram illustrating a method for transition zone RFID tag management, in accordance with examples of the technology disclosed herein.

Referring to FIG. 7, a method for transition zone RFID tag management is illustrated, in accordance with examples of the technology disclosed herein. In such methods, a plurality of RFID reader antennas are deployed at each transition between separate areas of a facility—Block 710. Each antenna is deployed at a given transition covering a span of the given transition from a different perspective such that each point in the span is covered by at least two antennas.

Antennas of a first transition between a first area and a second area of the separate areas detect, in combination with an RFID system in communication with the antennas of the first transition, a tag known to have been in the first area, and identifying an item associated with the detected tag as moving to the second area—Block 720.

Subsequently, the antennas of a particular transition of the second area detect, in combination with the RFID system in communication therewith, the tag, and identifying the detected item as leaving the second area for an area across the particular transition—Block 730.

In summary, examples of the technology disclosed herein use two pairs of overhead RFID antennas in a transition between separate areas of a facility, each pair is positioned such that they are close to the threshold between areas. By tracking RFID transitions into each area, a report can be generated to show real time and historical status of tags in each area. Reports can include a list of tags in each area. Instead of a persistent, constant or semi-constant approach, examples of the present technology determine location only at transitions. Typical systems use "real time" reading, which presents accuracy challenges due to body and garment shielding unless a large number of antennas are involved, which would increase costs.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine-readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof Other implementations will be apparent to those skilled in the art from a consideration of the specification or from a practice in accordance with examples disclosed herein.

The invention claimed is:

1. A method for tracking items, comprising:
    deploying at each transition between separate areas of a facility a plurality of RFID reader antennas, each antenna deployed at a given transition covering a span of the given transition from a different perspective such that each point in the span is covered by at least two antennas;
    detecting, by the antennas of a first transition between a first area and a second area of the separate areas, and in combination with an RFID system in communication with the antennas of the first transition, a tag known to have been in the first area, and identifying an item associated with the detected tag as moving to the second area; and
    subsequently detecting, by the antennas of a particular transition of the second area, and in combination with the RFID system in communication therewith, the tag, and identifying the detected item as leaving the second area for an area across the particular transition.

2. The method of claim 1, wherein detecting comprises timestamping each detection.

3. The method of claim 2, further comprising reporting, by the RFID system, a location of an item associated with the tag over time.

4. The method of claim 1, wherein each antenna is a narrow beam antenna with less than 40 degree beam width.

5. The method of claim 1, wherein each antenna is a beam steerable.

6. The method of claim 1, wherein a shielding object shields an item with a tag from a field of view of a first antenna, but not from a field of view of a second antenna.

7. A system for tracking items, comprising:
    at least one set of RFID reader antennas, each set comprising at least two antennas, each antenna in a given set deployed at a transition between two separate areas of a facility, each antenna deployed at the transition covering a span of the transition from a different perspective such that each point in the span is covered by at least two antennas, each antenna operative to transmit an RFID interrogation signal and receive an RFID tag response in response thereto; and
    an RFID system, in communication with each antenna, and operative to:
        detect, in combination with a first set of the at least one set of RFID reader antennas deployed at a first transition between a first area and a second area of the separate areas, a tag known to have been in the first area, and identify an item associated with the detected tag as moving to the second area; and
        subsequently detect, in combination with a second set of the at least one set of RFID reader antennas deployed at a second transition of the second area, the tag and identify the item associated with the tag as leaving the second area for an area across the second transition.

8. The system of claim 7, wherein detecting comprises timestamping each detection.

9. The system of claim 8, further comprising reporting, by the RFID system, a location of an item associated with the tag over time.

10. The system of claim 7, wherein each antenna is a narrow beam antenna with less than 40 degree beam width.

11. The system of claim 7, wherein each antenna is a beam steerable.

12. The system of claim 7, wherein a shielding object shields an item with a tag from a field of view of a first antenna, but not from a field of view of a second antenna.

13. A computer program product for tracking items, comprising a non-transitory computer readable medium storing computer-executable instructions thereof, that when executed by an RFID system in communication with a plurality of RFID reader antennas, each antenna deployed at a given transition covering a span of the given transition from a different perspective such that each point in the span is covered by at least two antennas, cause the RFID system to:
    detect, by the antennas of a first transition between a first area and a second area, and in combination with an RFID system in communication with the antennas of the first transition, a tag known to have been in the first area, and identifying an item associated with the detected tag as moving to the second area; and
    subsequently detect, by the antennas of a particular transition of the second area, and in combination with the RFID system in communication therewith, the tag, and identifying the detected item as leaving the second area for an area across the particular transition.

14. The computer program product of claim 13, wherein detecting comprises timestamping each detection.

15. The computer program product of claim 14, further comprising reporting, by the RFID system, a location of an item associated with the tag over time.

16. The computer program product of claim 13, wherein each antenna is a narrow beam antenna with less than 40 degree beam width.

17. The computer program product of claim 13, wherein each antenna is a beam steerable.

18. The computer program product of claim 13, wherein a shielding object shields an item with a tag from a field of view of a first antenna, but not from a field of view of a second antenna.

* * * * *